(12) United States Patent
Phlegm et al.

(10) Patent No.: US 8,865,333 B2
(45) Date of Patent: Oct. 21, 2014

(54) SYSTEMS AND METHODS FOR MITIGATING BATTERY DAMAGE CAUSED BY COOLANT LEAKS

(75) Inventors: Herman K. Phlegm, Oak Park, MI (US); Mahmoud H. Abd Elhamid, Troy, MI (US); Andrew C. Brenz, Troy, MI (US); Andrew J. Namou, West Bloomfield, MI (US); Milind S Gandhi, Shelby Township, MI (US); Robert D. Drexler, Clawson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 115 days.

(21) Appl. No.: 13/551,140

(22) Filed: Jul. 17, 2012

(65) Prior Publication Data

US 2014/0020763 A1    Jan. 23, 2014

(51) Int. Cl.
| | |
|---|---|
| *H01M 10/42* | (2006.01) |
| *H01M 10/50* | (2006.01) |
| *B60L 11/18* | (2006.01) |
| *G01M 3/04* | (2006.01) |
| *G01M 3/16* | (2006.01) |

(52) U.S. Cl.
USPC .............................. 429/120; 429/16; 180/68.5

(58) Field of Classification Search
USPC .................................... 429/120, 61; 180/68.5
See application file for complete search history.

(56) References Cited

U.S. PATENT DOCUMENTS

| | | | | |
|---|---|---|---|---|
| 5,541,575 | A | * | 7/1996 | Virnich ........................ 340/506 |
| 5,756,227 | A | * | 5/1998 | Suzuki et al. .................... 429/62 |
| 2002/0121132 | A1 | * | 9/2002 | Breed et al. ..................... 73/146 |
| 2004/0056890 | A1 | * | 3/2004 | Hao et al. ...................... 345/744 |
| 2011/0217573 | A1 | * | 9/2011 | Kritzer et al. ................... 429/61 |
| 2013/0073234 | A1 | * | 3/2013 | LePort et al. ................... 702/63 |

FOREIGN PATENT DOCUMENTS

| | | | | |
|---|---|---|---|---|
| DE | 10 2005 055714 | B3 | * | 11/2005 |
| JP | 08115741 | A | * | 5/1996 |
| JP | 2000030738 | A | * | 1/2000 |
| JP | 2000251921 | A | * | 9/2000 |
| JP | 2009112487 | A | * | 5/2009 |

* cited by examiner

*Primary Examiner* — Gregg Cantelmo
(74) *Attorney, Agent, or Firm* — Phillips Ryther & Winchester; John P. Davis (57) ABSTRACT

System and methods for mitigating battery damage in a vehicle including a liquid-cooled battery system. In certain embodiments, a system for mitigating damage caused by leaks of liquid coolant in a battery system may include a one or more coolant leak sensors. A coolant leak detection system communicatively coupled to the coolant leak sensors may be configured to detect an occurrence of a liquid coolant leak in the battery system based on information provided by the coolant leak sensors. One or more valves communicatively coupled with the coolant leak detection system may actuate by the coolant leak detection system when a leak of liquid coolant is detected, thereby allowing leaked liquid coolant to drain from the battery system.

19 Claims, 7 Drawing Sheets

SYSTEMS AND METHODS FOR MITIGATING BATTERY DAMAGE CAUSED BY COOLANT LEAKS

TECHNICAL FIELD

This disclosure relates to systems and methods for mitigating battery damage in a vehicle. More specifically, but not exclusively, this disclosure relates to system and methods for mitigating battery damage in a vehicle caused by aqueous solution leaks, including liquid coolant leaks.

BACKGROUND

Passenger vehicles often include electric batteries for operating features of vehicle electrical and drivetrain systems. For example, vehicles commonly include a 12V lead-acid automotive battery configured to supply electric energy to vehicle starter systems (e.g., a starter motor), lighting systems, and/or ignition systems. In electric, fuel cell ("FC"), and/or hybrid vehicles, a low voltage vehicle battery may be used to supply electric energy to a certain subset of vehicle features not powered by a high voltage ("HV") battery system used primarily to power electric drivetrain components (e.g., electric drive motors and the like).

In certain vehicle designs, battery systems included in a vehicle may be liquid-cooled using aqueous coolants such as ethylene glycol and water compositions. For example, to dissipate heat generated by a HV battery, a HV battery system may integrate a cooling system configured to cool the HV battery using a liquid coolant. Manufacturing errors in the battery and/or cooling system, vehicle impact events (e.g., collisions), and/or degradation of components of the cooling system, however, may result in liquid coolant leaking from containment reservoirs and/or other coolant transport components (e.g., piping, valves, and the like) into the battery system. Leaked coolant may cause a variety of problems, including electrical malfunctions caused by liquid coolant shorting electronics included in the battery system and/or thermal events. Water condensation in the battery system caused by, for example, changes in air pressure and/or relative humidity, may also cause similar problems.

SUMMARY

Systems and methods are presented for mitigating battery damage in a vehicle including a liquid-cooled battery system. In certain embodiments, a system for mitigating damage caused by leaks of liquid coolant in a battery system may include one or more coolant leak sensors. A coolant leak detection system communicatively coupled to the coolant leak sensors may be configured to detect an occurrence of a liquid coolant leak in the battery system based on information provided by the coolant leak sensors. One or more valves communicatively coupled with the coolant leak detection system may actuated by the coolant leak detection system when a leak of liquid coolant is detected, thereby allowing leaked liquid coolant to drain from the battery system.

In further embodiments, a method for mitigating damage caused by leaks of liquid coolant in a battery system may include receiving measurement information from one or more coolant leak sensors disposed in the battery system. Based on the measurement information, a determination may be made whether a liquid coolant leak has occurred in the battery system. If it is determined a liquid coolant leak has occurred, a valve may be actuated to allow leaked liquid coolant to drain from the battery system.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of systems and methods consistent with embodiments of the present disclosure is provided below. While several embodiments are described, it should be understood that disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Embodiments of the systems and methods disclosed herein may detect leaks of coolant in a liquid-cooled battery system and/or take action to mitigate damage to the battery system. Particularly, embodiments of the systems and methods disclosed herein may detect the presence of a coolant leak using a sensor (e.g., a dielectric sensor, a capacitive sensor, a resistive sensor, a current density sensor, and/or the like). When a leak is detected, a solenoid or other suitable actuation device may activate a valve to allow leaked coolant to drain from the battery system. A pump and/or other device may also be used in some embodiments to actively drain the coolant. By allowing leaked coolant to drain from the battery system, damage to the system may be mitigated. Further embodiments may provide for other related functions, such as notifying a user of a coolant leak. Such notifications may take place by, for example, providing an audio and/or visual notification to a user, sending a test message, e-mail, telephone call, voice-mail, or other notification to the user, and/or using any other suitable notification technique.

Additional embodiments of the systems and methods disclosed herein may detect the presence of water condensate in a battery system and/or take action to mitigate damage to the battery system caused by water condensation. The presence of water condensate in the battery system may be detected using a sensor, which in some embodiments may be the same sensor used to detect the presence of a coolant leak. In further embodiments, a different sensor may be used to detect the presence of water condensate in the battery system. When a leak is detected, a solenoid or other suitable actuation device may activate a valve to allow water condensate to drain from the battery system, thereby mitigating damage to the system.

Figure 1:
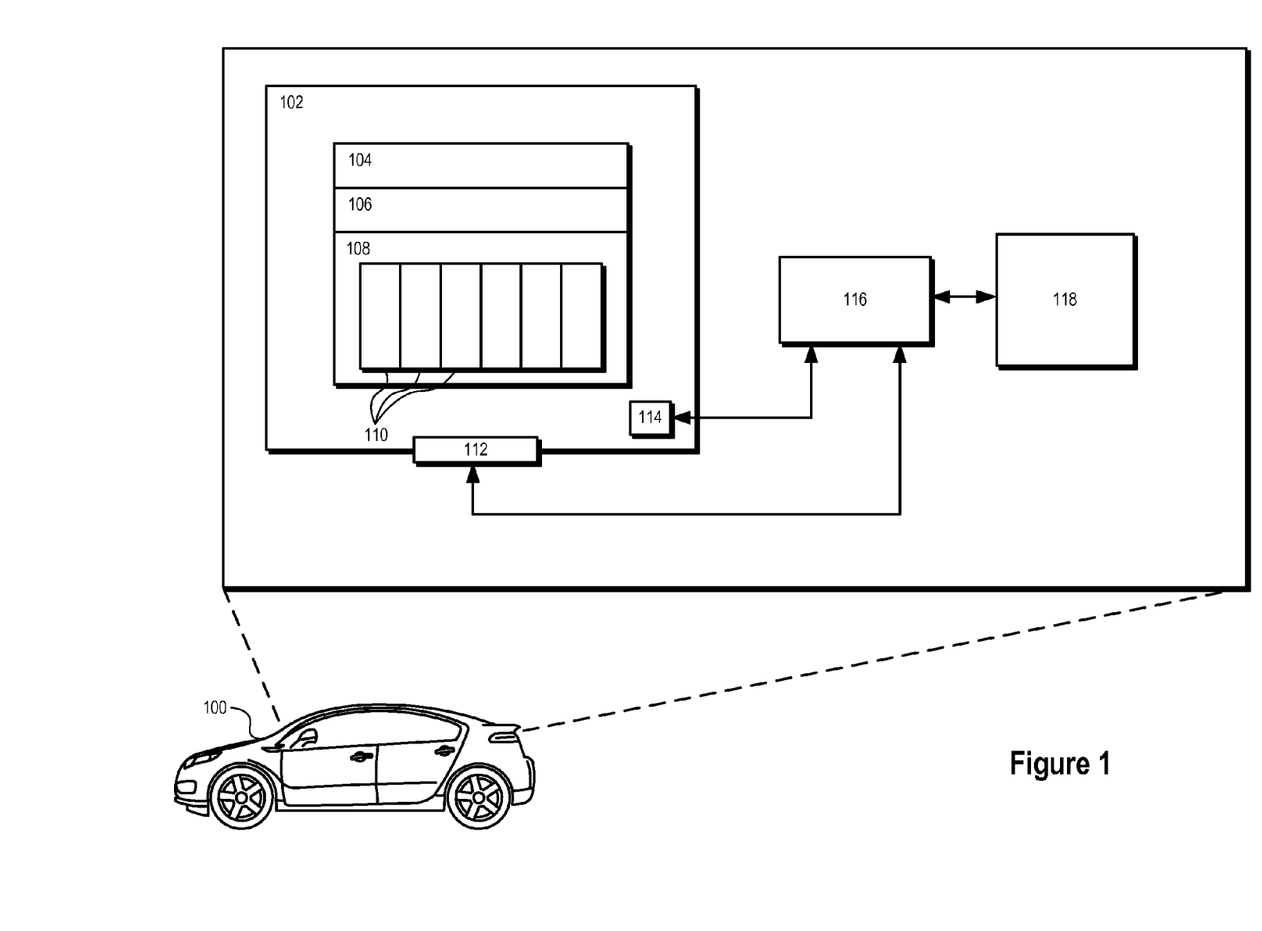
FIG. 1 illustrates an exemplary system for preventing battery system damage in a vehicle caused by coolant leaks consistent with embodiments disclosed herein.

FIG. 1 illustrates an exemplary system for preventing battery system damage in a vehicle 100 caused by coolant leaks consistent with embodiments disclosed herein. In further embodiments, as discussed below, the exemplary system may be utilized to prevent battery system damage caused by water condensation. The vehicle 100 may be a motor vehicle, a marine vehicle, an aircraft, and/or any other type of vehicle, and may include an internal combustion engine ("ICE") drivetrain, an electric motor drivetrain, a hybrid engine drivetrain, a FC drivetrain, and/or any other type of drivetrain suitable for incorporating the systems and methods disclosed herein. The vehicle 100 may include a battery system 102 that, in certain embodiments, may be a HV battery system. The HV battery system may be used to power electric drivetrain components (e.g., as in an electric, hybrid, or FC power system). In further embodiments, the battery system 102 may be a low voltage battery (e.g., a lead-acid 12V automotive battery) and may be configured to supply electric energy to a variety of vehicle 100 systems including, for example, vehicle starter systems (e.g., a starter motor), lighting systems, ignition systems, and/or the like.

The battery system 102 may include battery electronics 104. The battery electronics 104 may be configured to monitor and control certain operations of the battery system 102. For example, the battery electronics 104 may be configured to monitor and control charging and/or discharging operations of the battery system 102. In certain embodiments, the battery electronics 104 may be communicatively coupled with one or more sensors (e.g., state-of-charge ("SOC") sensors), actuation devices (e.g., electrical relays), and/or systems configured to enable the battery electronics 104 to monitor and control operations of the battery system 102. The battery electronics 104 may further be configured to provide information to and/or receive information from other systems included in the vehicle 100. For example, the battery electronics 104 may be communicatively coupled with a coolant leak detection system 116 (described in detail blow), an engine control module ("ECM") 118, and/or a vehicle telematics system (not illustrated). In certain embodiments, the battery electronics 104 may be configured, at least in part, to provide information regarding the battery system 102 to a user of the vehicle 100 including, for example, battery SOC information, battery operating time information, battery operating temperature information, and/or any other information regarding the battery system 102 of interest to a user.

The battery system 102 may include one or more battery packs 108 suitably sized to provide sufficient electrical power to the vehicle 100. Each battery pack 108 may include one or more battery modules 110. The battery modules 110 may comprise one or more battery cells utilizing any suitable battery technology including, for example, lead-acid, nickel-metal hydride ("NiMH"), lithium-ion ("Li-Ion"), Li-Ion polymer, lithium-air, nickel-cadmium ("NiCad"), valve-regulated lead-acid ("VRLA") including absorbed glass mat ("AGM"), nickel-zinc ("NiZn"), molten salt (e.g., a ZEBRA battery), and/or any other suitable battery technologies.

Under normal operation (e.g., charging and/or discharging), the battery system 102 and/or associated systems may produce heat. In certain circumstances, however, the temperature of the battery system 102 may affect battery performance. For example, battery temperature may affect operation of an electrochemical system included in the battery system 102, performance of a vehicle 100 including the battery system 102, round trip efficiency and/or charge acceptance of the battery system 102, power and energy of the battery system 102, safety and reliability of the battery system 102, and/or life and life cycle cost of the battery system 102. To regulate the temperature of the battery system 102, the battery system 102 may include a liquid cooling system 106.

The liquid cooling system 106 may be configured to circulate and/or distribute an aqueous and/or liquid coolant to various components and/or systems included in the battery system 102, thereby regulating the temperature of the components and/or systems. In certain embodiments, the liquid cooling system 106 may be further configured to circulate the liquid coolant to various components and/or systems included elsewhere in the vehicle 100. By utilizing a liquid cooling system 106 to regulate temperature of the battery system 102 (e.g., regulate the temperature within a desired range), the performance of the battery system 102 may be optimized, uneven temperature distributions and unbalanced battery packs 108 in the battery system 102 may be reduced, and/or potential hazards attributable to uncontrolled battery temperature may be minimized.

The liquid cooling system 106 may comprise any suitable number of pumps, valves coolant circulation paths (e.g., piping), coolant reservoirs, heat exchangers (e.g., liquid/liquid, liquid/air, liquid/AC unit, and the like), cooling system electronics (e.g., feedback mechanisms, temperature sensors, thermostats, coolant flow sensors, pump and heat exchanger control electronics, and the like), and/or any other cooling system component and/or system in any suitable configuration for circulating the liquid coolant to various components and systems included in the battery system 102. The liquid coolant may be a substantially aqueous coolant solution. In some embodiments, the liquid coolant may comprise any combination and/or concentration of water, methanol, glycol, ethylene glycol, propylene glycol, glycerol, Dex-cool®, and/or any other suitable coolant material.

As discussed above, manufacturing errors in the battery system 102 and/or liquid cooling system 106, vehicle impact events (e.g., collisions), and/or degradation of components of the liquid cooling system 106, may result in liquid coolant leaking from coolant circulation paths, coolant reservoirs, and/or other coolant transport components (e.g., pumps, valves, and the like) into the battery system 102. Leaked coolant may cause a variety of problems, including electrical malfunctions caused by liquid coolant (e.g., electrical shorts in the battery electronics 104 and electronics associated with the liquid cooling system 106) and/or thermal events.

To mitigate damage to the battery system 102 caused by liquid coolant leaks, the vehicle 100 may include a coolant leak detection system 116. In certain embodiments, the coolant leak detection system 116 may be included in the vehicle 100 separate from the battery system 102. In further embodiments, the coolant leak detection system 116 may be integrated into the battery system 102. The coolant leak detection system 116 may be communicatively coupled to one or more coolant leak sensors 114. The coolant leak sensor(s) 114 may be configured detect and/or provide information to the coolant leak detection system 116 relating to leaks of liquid coolant in the battery system 102. In certain embodiments, the coolant leak sensor(s) 114 may comprise a dielectric sensor, a capacitive sensor, a resistive sensor, a current density sensor, and/or a broadband dielectric spectrophotometer. Any other suitable type of sensor for detecting a leak of liquid coolant in the battery system 102 may also be used. In addition, although FIG. 1 illustrates a single coolant leak sensor 114, the use of multiple coolant link sensors 114 disposed throughout the battery system 102 (e.g., in multiple battery compartments or the like) is also contemplated. Moreover, different types of coolant leak sensors 114 may be utilized. For example, in certain embodiments, both a dielectric sensor and a resistive sensor may be utilized. The coolant leak sensor 114 may be configured to monitor for liquid coolant leaks continuously, periodically, quasi-randomly, and/or randomly.

In some embodiments, multiple coolant leak sensors 114 may be placed at strategic locations (e.g., in the battery system 102 and/or liquid cooling systems 106). For example, one or more leak sensors 114 may be placed at or near a heat exchanger, one or more may be placed at desired locations on and/or near piping connections, and/or one or more may be placed at one or more strategic locations on or near the battery system 102, battery packs 108, and/or battery modules 110. In certain embodiments, the locations of the coolant leak sensors 114 may include locations that are likely to experience leaks. Based on information provided by the coolant leak sensors 114, the coolant leak detection system 116 may determine that liquid coolant has leaked from the liquid cooling system 106. Upon determining that a coolant leak has occurred, the coolant leak detection system 116 may take action to allow leaked coolant to drain from the battery system 102. Such draining may comprise active draining (e.g., provided via a pump), passive draining that may rely upon gravity, and/or both active and passive draining elements. For example, the coolant leak detection system 116 may cause a valve 112 to be actuated to allow leaked liquid coolant to drain from the battery system 102. In certain embodiments, the coolant leak detection system 116 may activate a switch, solenoid, or other similar actuation device, configured to cause the valve 116 to be actuated (e.g., opened). Although FIG. 1, illustrates a single valve 112 for allowing liquid coolant to drain from the battery system 102, the use of multiple valves 112 disposed throughout the battery system 102 (e.g., in multiple battery compartments or the like) is also contemplated. Further, as discussed above, one or more pumps may also be activated to actively drain coolant through the valves 112. Alternative embodiments may be configured such that, upon detecting a leak of liquid coolant in the battery system 102, portions of the battery system 102 containing the leak and/or the liquid cooling system 106 may be isolated using valve 112, which may operate as an actuating barrier, a valve, and/or the like).

In certain embodiments, the coolant leak sensor 114 may further detect and/or provide information to the coolant leak detection system 116 indicating that a leak of liquid coolant in the battery system 102 has been mitigated. For example, the coolant leak sensor 114 may detect and/or provide information to the coolant leak detection system 116 indicating that leaked liquid coolant is no longer proximate to the coolant leak sensor 114, or at least that a sufficient amount of the leaked liquid coolant has been removed to mitigate the likely problems resulting from such leakage. Using this information, the coolant leak detection system 116 may cause one or more of valve(s) 112 to close, thereby sealing the one or more valves (s) and substantially preventing any liquid coolant and/or other materials from passing through the one or more valve(s) 112 causing coolant to flow throughout the system, or throughout one or more subsets of the system, as normal.

In some embodiments, the coolant leak detection system 116 may be communicatively coupled with an ECM 118, a vehicle telematics system (e.g., an OnStar® system by OnStar® Corporation, a subsidiary of General Motors Corporation), and/or other vehicle systems, and may be configured to communicate information related to liquid coolant leaks in the battery system 102 and/or operations of the coolant leak detection systems 116 to these systems. Using this information, the ECM 118, vehicle telematics system, and/or other vehicle systems may perform a variety of functions. For example, the systems may notify a user of a coolant leak by, for example, providing an audio and/or visual notification to a user (e.g., on a display included in the vehicle 102), sending a text message, e-mail, telephone call, voicemail, or other notification to the user, and/or using any other suitable notification technique. Further, the systems may store information related to the detection of a coolant leak for future diagnostic purposes. In addition, the systems may take further action to minimize damage to the battery system 102 and/or vehicle 100 caused by the leak of liquid coolant (e.g., shutting down the vehicle, reducing energy consumption from the battery system 102, and/or the like). Alternatively, a user may be provided with one or more of the foregoing options and the systems may await a response from the user before initiating one or more of the foregoing options.

As noted above, changes in air pressure and/or relative humidity may cause water to condense within the battery system 102, causing damage to the battery system 102 and/or its components similar to that caused by a coolant leak. In certain embodiments, the coolant leak detection system 116 and/or another similar leak system, may also utilize the coolant leak sensors 114 and/or one or more other sensors to detect the presence of water condensate in the battery system 102. Upon determining that water condensation is present in the battery system 102, the coolant leak detection system 116 may take action to allow the water condensate to drain from the battery system 102. For example, when water condensate is detected, the coolant leak detection system 116 may direct a solenoid or other suitable actuation device to active one or more valves 112 to allow water condensate to drain from the battery system 102.

In certain embodiments, the coolant leak sensors 114 may be further configured to differentiate between an aqueous liquid coolant solution and an aqueous solution attributed to water condensation, and to take certain actions based on the type of detected aqueous solution. For example, in some embodiments, the coolant leak sensors 114 may comprise a dielectric sensor. Based on a relatively large difference between the dielectric constants of an aqueous water solution and an aqueous coolant solution, the dielectric coolant leak sensor 114 and/or coolant leak detection system 116 may determine whether an aqueous solution attributed to water condensation and/or an aqueous liquid coolant solution is present in the battery system 102. In certain embodiments, if an aqueous solution attributed to water condensation is detected, the coolant leak detection system 116 may direct a solenoid or other suitable actuation device to activate one or more valves 112 to allow water condensate to drain from the battery system 102 without notifying a user of the vehicle of the presence of water condensation in the battery system 102. In further embodiments, a notification may be provided to the user of the vehicle 100 and/or information relating the detection of water condensation in the battery system 102 may be stored in one or more systems included in the vehicle for future diagnostic purposes. If an aqueous coolant solution is detected, the coolant leak detection system 116 may take certain actions described above (e.g., activating one or more values 112 and/or providing one or more notifications to a user of the vehicle 100).

Figure 2:
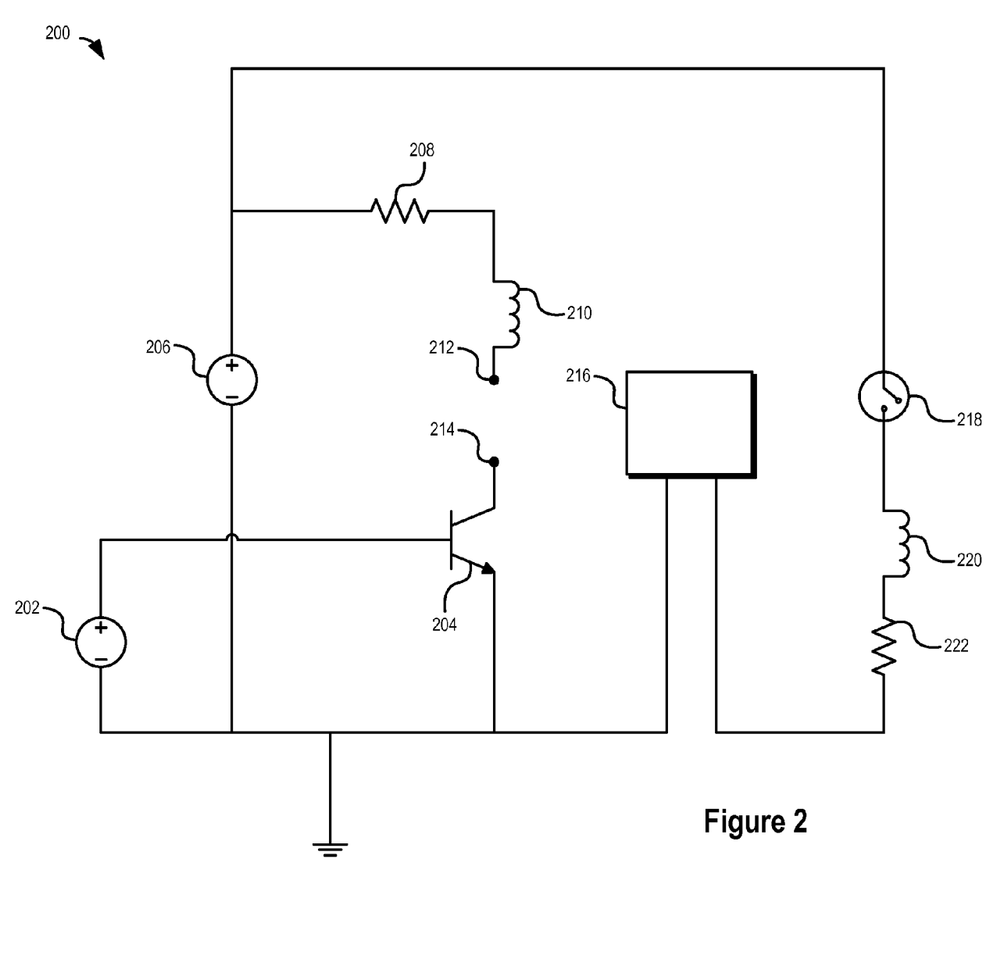
FIG. 2 illustrates an exemplary circuit for preventing battery system damage in a vehicle caused by coolant leaks consistent with embodiments disclosed herein.

FIG. 2 illustrates an exemplary circuit 200 for preventing battery system damage in a vehicle 100 caused by coolant leaks consistent with embodiments disclosed herein. Embodiments of the illustrated circuit 200 may be utilized in the valve 112, the coolant leak sensor 114, and/or the coolant leak detection system 116 discussed above in reference to FIG. 1. Particularly, the illustrated circuit 200 may incorporate a dielectric sensor as a coolant leak sensor 114 and a hall-effect switch 216 to actuate a valve 112. The hall-effect switch 216 may be calibrated to one or more thresholds allowing for the detection of liquid solution in the battery system 102 and/or the differentiation between a liquid coolant solution and/or liquid associated with water condensation. The circuit 200 may include a high-speed ("HS") switched (i.e., pulsing) power supply 202. A first terminal (e.g., positive) of the HS switched power supply 202 may be coupled to a base terminal of a bi-polar junction transistor ("BJT") 204 (e.g., a NPN BJT) and a second terminal (e.g., negative) of the HS switched power supply 202 may be coupled to ground. An emitter terminal of the BJT 204 may be coupled to ground and a collector terminal may be coupled to a first dielectric measurement contact point 214. A second dielectric measurement contact point 212 may be coupled to a first terminal (e.g., positive) of a power supply 206 (e.g., a 12V DC power supply) via a resistor 208 and an inductor 210. In certain embodiments, the circuit 200 may be used to measure a dielectric constant between the first and second dielectric measurement contact points 214, 212. In further embodiments, a dielectric sensor (not shown) may be coupled to the circuit 200 between the first and second dielectric measurement contact points 214, 212.

The second terminal (e.g., negative) of the power supply 206 may be coupled to ground. A first terminal of a current switch ("CSW") 218 may be coupled to the first terminal of the power supply 206. A second terminal of the CSW 218 may be coupled to a first terminal of a hall-effect switch 216 via an inductor 220 and a resistor 222. A second terminal of the hall-effect switch 216 may be coupled to ground. Based on a measured dielectric between the first and second dielectric measurement contact points 214, 212, the circuit 200 may be configured detect a leak of liquid coolant in a battery system 102 and to actuate a valve 112, thereby draining the liquid coolant and mitigating damage to the battery system 102. In further embodiments, the circuit 200 may be configured to determine whether a leak of a liquid solution in the battery system 102 is liquid coolant or water condensate, and to take certain actions based on the type of detected solution.

Figure 3:
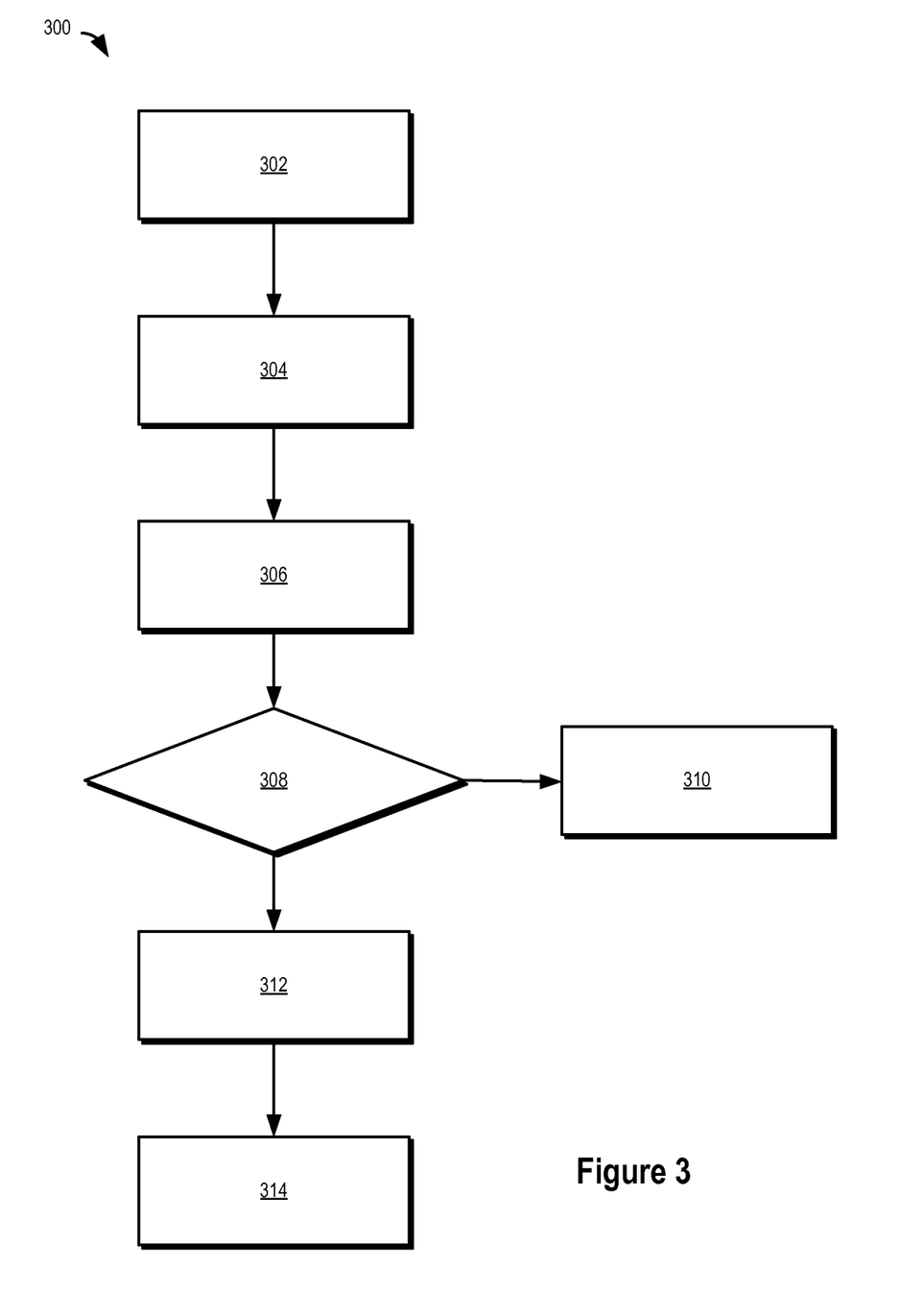
FIG. 3 illustrates a flow chart of an exemplary method for preventing battery system damage caused by coolant leaks consistent with embodiments disclosed herein.

FIG. 3 illustrates a flow chart of an exemplary method 300 for preventing battery system damage caused by coolant leaks consistent with embodiments disclosed herein. The illustrated method 300 may be performed using, at least in part, the valve 112, the coolant leak sensor 114, and/or the coolant leak detection system 116. In certain embodiments, the method 300 may be performed using a circuit incorporating a dielectric sensor as a coolant leak sensor 114 and a hall-effect switch to actuate a valve 112 (e.g., as illustrated in FIG. 2). At 302, a HS switched (i.e., pulsing) power source included in a dielectric sensor may be enabled. At 304, a switching time period and/or frequency of the HS switched power source may be set (e.g., <1 s time period). At 306, a rising pulse from the HS switched power source may be periodically inrushed.

At 308, a determination may be made whether a produced current and/or magnetic pulse exceeds one or more predetermined thresholds. If a threshold is not exceeded, at 310, a determination may be made that there is not a liquid coolant leak in the battery system 102. If a threshold is exceeded, at 312, a determination may be made that there is a liquid coolant leak in the battery system 102 and a hall-effect switch may be actuated. This is turn may cause one or more valves 112 to be actuated (e.g., via a switch, solenoid, or the like), at 314, thereby draining leaked liquid coolant in the battery system 102 and mitigating damage to the battery system 102.

Figure 4:
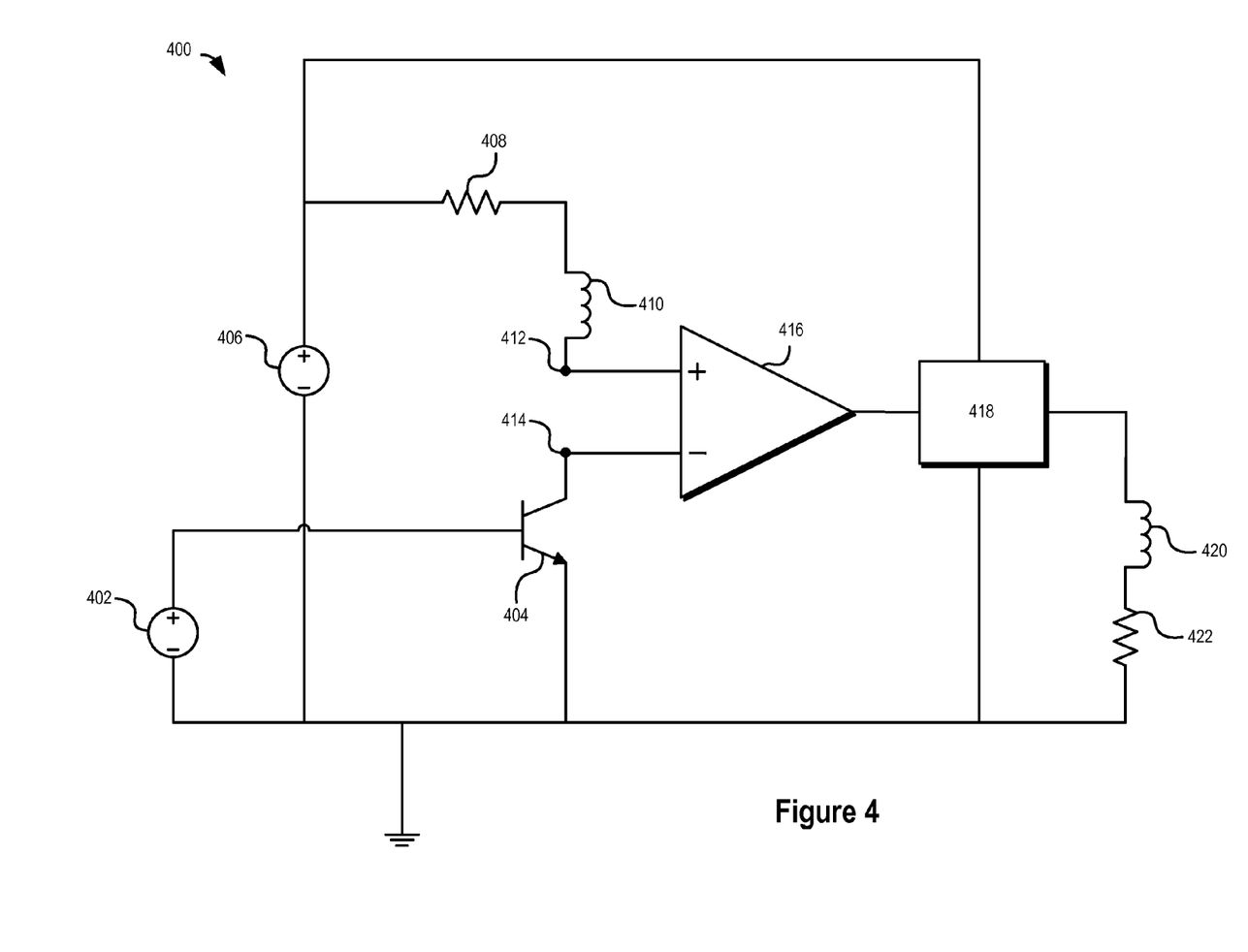
FIG. 4 illustrates another exemplary circuit for preventing battery system damage in a vehicle caused by coolant leaks consistent with embodiments disclosed herein.

FIG. 4 illustrates another exemplary circuit 400 for preventing battery system damage in a vehicle 100 caused by coolant leaks consistent with embodiments disclosed herein. Embodiments of the illustrated circuit 400 may be utilized in the valve 112, the coolant leak sensor 114, and/or the coolant leak detection system 116 discussed above in reference to FIG. 1. Particularly, the illustrated circuit 400 may incorporate a dielectric sensor as a coolant leak sensor 114 and a microcontroller 418 to actuate a valve 112. The circuit 400 may include a HS switched (i.e., pulsing) power supply 202. A first terminal (e.g., positive) of the HS switched power supply 402 may be coupled to a base terminal of a BJT 404 (e.g., a NPN BJT) and a second terminal (e.g., negative) of the HS switched power supply 402 may be coupled to ground. An emitter terminal of the BJT 404 may be coupled to ground and a collector terminal may be coupled to a first dielectric measurement contact point 414. A second dielectric measurement contact point 412 may be coupled to a first terminal (e.g., positive) of a power supply 406 via a resistor 408 and an inductor 410. The second terminal (e.g., negative) of the power supply 406 may be coupled to ground. A first input of a microcontroller 418 may be coupled to the first terminal of the power supply 406. A second input of the microcontroller may be coupled to ground via an inductor 220 and a resistor 222. A third input of the microcontroller 418 may be coupled to ground.

The first dielectric measurement contact point 414 may be coupled to an inverting terminal of an operational amplifier 416. The second dielectric measurement contact point 412 may be coupled to a non-inverting terminal of the operation amplifier 416. In certain embodiments, the circuit 400 may be used to measure a dielectric constant between the first and second dielectric measurement contact points 414, 412. In further embodiments, a dielectric sensor (not shown) may be coupled to the circuit 400 between the first and second dielectric measurement contact points 414, 412. The output of the operational amplifier 416 may be coupled to a fourth input of the microcontroller 418. Based on a measured dielectric constant between the first and second dielectric measurement contact points 414, 412, the circuit 400 may be configured detect a leak of liquid coolant in a battery system 102 and to actuate a valve 112 (e.g., via a switch, solenoid, or the like), thereby draining the liquid coolant and mitigating damage to the battery system 102. In further embodiments, the circuit 500 may be configured to determine whether a leak of a liquid solution in the battery system 102 is liquid coolant or water condensate, and to take certain actions based on the type of detected solution.

Figure 5:
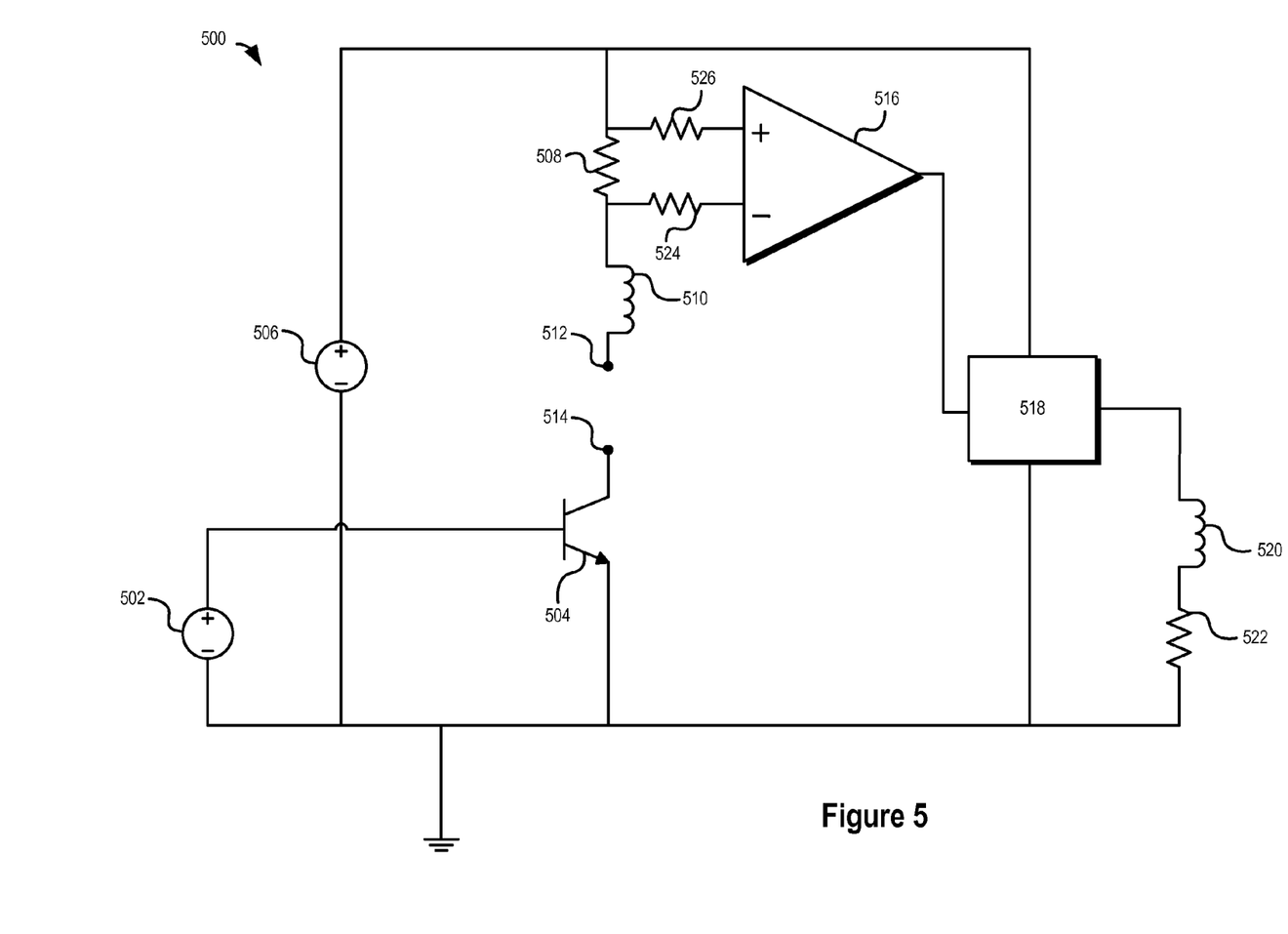
FIG. 5 illustrates yet another exemplary circuit for preventing battery system damage in a vehicle caused by coolant leaks consistent with embodiments disclosed herein.

FIG. 5 illustrates yet another exemplary circuit 500 for preventing battery system damage in a vehicle 100 caused by coolant leaks consistent with embodiments disclosed herein. Embodiments of the illustrated circuit 500 may be utilized in the valve 112, the coolant leak sensor 114, and/or the coolant leak detect system 116 discussed above in reference to FIG. 1. Particularly, the illustrated circuit 500 may incorporate a dielectric sensor as a coolant leak sensor 114 and a microcontroller 518 to actuate a valve 112. The circuit 500 may include a HS switched (i.e., pulsing) power supply 502. A first terminal (e.g., positive) of the HS switched power supply 502 may be coupled to a base terminal of a BJT 504 (e.g., a NPN BJT) and a second terminal (e.g., negative) of the HS switched power supply 502 may be coupled to ground. An emitter terminal of the BJT 504 may be coupled to ground and a collector terminal may be coupled to a first dielectric measurement contact point 514. A second dielectric measurement contact point 512 may be coupled to a first terminal (e.g., positive) of a power supply 506 via a resistor 508 and an inductor 510. In certain embodiments, the circuit 500 may be used to measure a dielectric constant between the first and second dielectric measurement contact points 514, 512. In further embodiments, a dielectric sensor (not shown) may be coupled to the circuit 400 between the first and second dielectric measurement contact points 514, 512. The second terminal (e.g., negative) of the power supply 506 may be coupled to ground. A first input of a microcontroller 518 may be coupled to the first terminal of the power supply 406. A second input of the microcontroller may be coupled to ground via an inductor 520 and a resistor 522. A third input of the microcontroller 518 may be coupled to ground.

The first terminal of the power supply 506 may be coupled to a non-inverting terminal of an operational amplifier 516 via a resistor 526. An inverting terminal of the operational amplifier 516 may be coupled to a point between resistor 508 and inductor 510. The output of the operational amplifier 516 may be coupled to a fourth input of the microcontroller 518. Based on a measured dielectric between the first and second dielectric measurement contact points 514, 512, the circuit 500 may be configured detect a leak of liquid coolant in a battery system 102 and to actuate a valve 112 (e.g., via a switch, solenoid, or the like), thereby draining the liquid coolant and mitigating damage to the battery system 102. In further embodiments, the circuit 500 may be configured to determine whether a leak of a liquid solution in the battery system 102 is liquid coolant or water condensate, and to take certain actions based on the type of detected solution.

Figure 6:
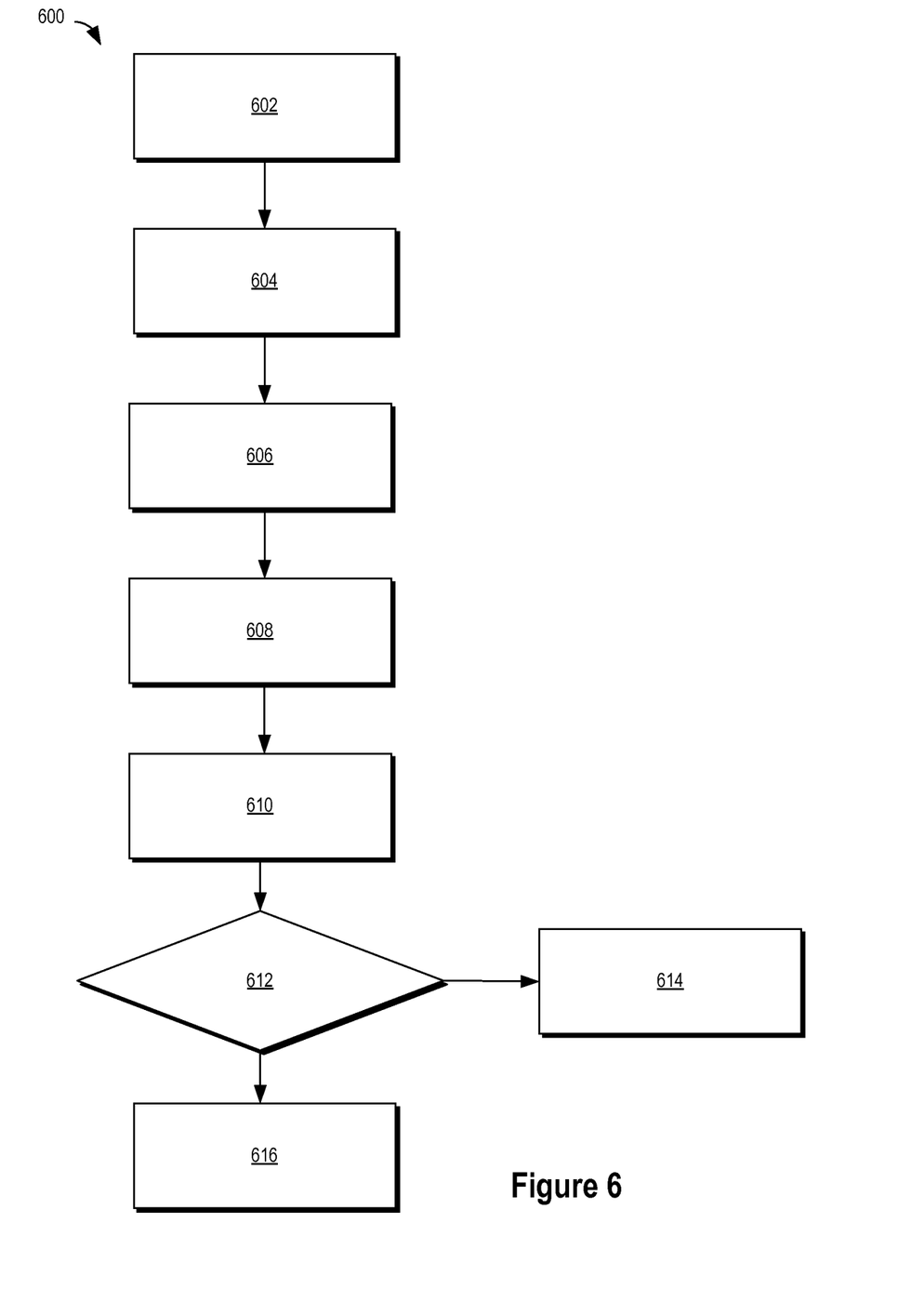
FIG. 6 illustrates a flow chart of another exemplary method for preventing battery system damage caused by coolant leaks consistent with embodiments disclosed herein.

FIG. 6 illustrates a flow chart of another exemplary method 600 for preventing battery system 102 damage caused by coolant leaks consistent with embodiments disclosed herein. The illustrated method 600 may be performed using, at least in part, the valve 112, the coolant leak sensor 114, and the coolant leak detection system 116. In certain embodiments, the method 600 may be performed using a circuit incorporating a dielectric sensor as a coolant leak sensor 114 and a microcontroller to actuate a valve 112 (e.g., as illustrated in FIG. 4 and FIG. 5). At 602, a HS switched (i.e., pulsing) power source included in a capacitive sensor may be enabled. At 604, the output of an operational amplifier included in a circuit implementing the method 600 (e.g., operational amplifier 416 illustrated in FIG. 4 and operational amplifier 516 illustrated in FIG. 5) may be monitored and/or recorded. In certain embodiments, this output may be monitored and/or recorded for one or more predetermined periods.

At 608, an integral and/or differential of the monitored and/or recorded output may be calculated. At 610, the results of this calculation may be compared against one or more predetermined thresholds (e.g., thresholds stored in a table). For example, at 612, a determination may be made whether the results of the calculation exceed one or more predetermined thresholds. If a threshold is not exceeded, at 614, a determination may be made that there is not a liquid coolant leak in the battery system 102. If a threshold is exceeded, at 616, a determination may be made that there is a liquid coolant leak in the battery system 102 and a microcontroller may issue a valve actuation control signal. This control signal may cause a valve 112 to be actuated (e.g., via a switch, solenoid, or the like), thereby draining leaked liquid coolant in the battery system 102 and mitigating damage to the battery system 102.

Figure 7:
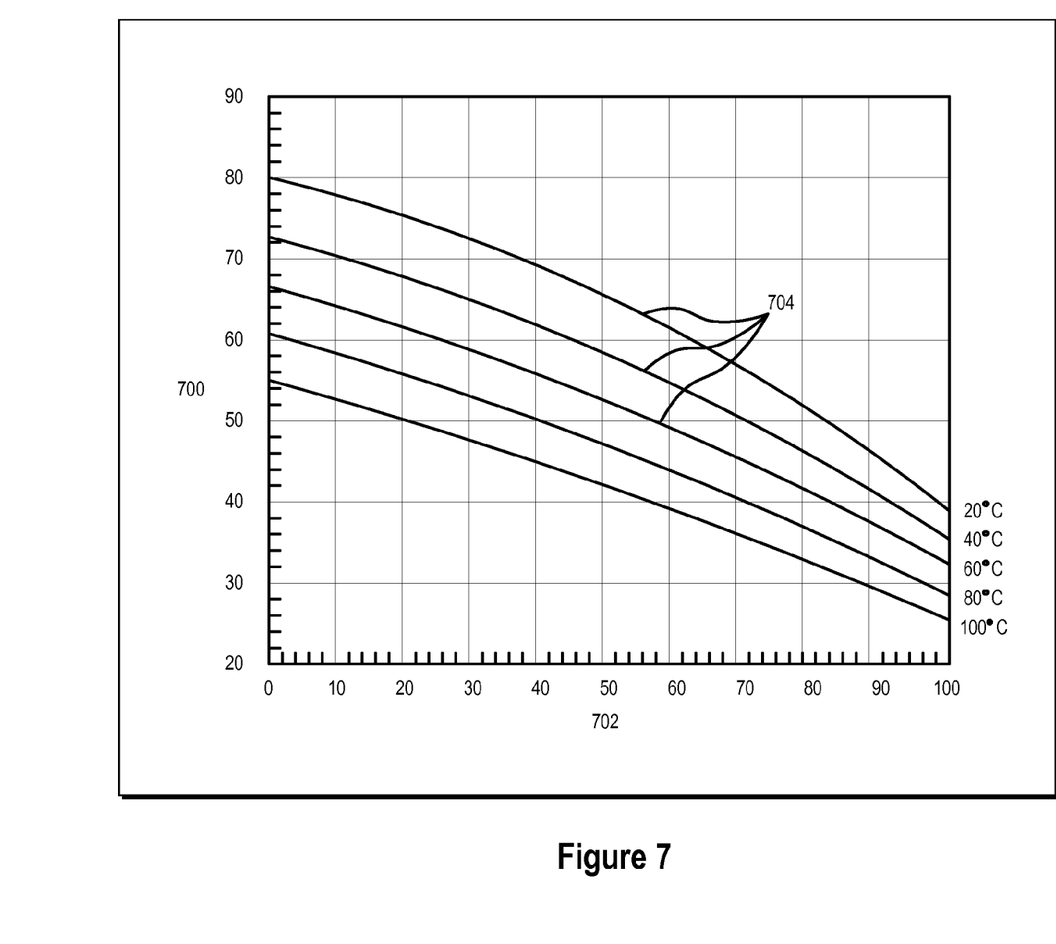
FIG. 7 illustrates a graph of exemplary dielectric constants at a plurality of temperatures of ethylene glycol at various percentages by weight in a water solution consistent with embodiments disclosed herein.

FIG. 7 illustrates a graph of exemplary dielectric constant curves 704 at 150 m., esu. at a plurality of temperatures (each corresponding with a separate curve 704). Axis 700 represents the dielectric constant of ethylene glycol at various percentages by weight in a water solution (i.e., axis 702) consistent with embodiments disclosed herein. As discussed above, systems and methods disclosed herein may utilize a dielectric constant sensor as a coolant leak sensor 114 to determine whether a liquid coolant leak has occurred in a battery system 102. In certain embodiments, the coolant leak sensor 114 may determine whether measured dielectric constants are below, within, and/or exceed one or more thresholds indicative of a liquid coolant leak. For example, the dielectric constant curves 704 illustrated in FIG. 7 may be utilized to determine one or more thresholds used in detecting the occurrence of a liquid coolant leak comprising ethylene glycol and/or distinguishing a liquid coolant leak from water condensation using systems and methods disclosed herein.

In certain embodiments, the systems and methods disclosed herein may be implemented, at least in part, using one or more computer systems. For example, certain features and functionality of the coolant leak detection system 116 may be implemented using a computer system. The systems and methods disclosed herein are not inherently related to any particular computer or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions that, when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic tape, a Bernoulli drive, a magnetic disk, a punch card, flash memory, integrated circuits, or any other non-transitory digital processing apparatus memory device.

Although the foregoing has been described in some detail for purposes of clarity, it will be apparent that certain changes and modifications may be made without departing from the principles thereof. For example, in certain embodiments, the coolant leak sensor 114 may be configured to incorporate certain features and/or functionality of the coolant leak detection system 116 and may interface directly with the valve 112. Similarly, certain features of the coolant leak detection system 116, the coolant leak sensor 114, and/or the valve 112 may be configured and/or combined in any suitable configuration or combination. Additional, certain systems and/or methods disclosed herein may be utilized in a liquid-cooled battery system not included in a vehicle (e.g., a backup power battery system or the like). It is noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

The foregoing specification has been described with reference to various embodiments. However, one of ordinary skill in the art will appreciate that various modifications and changes can be made without departing from the scope of the present disclosure. For example, various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

As used herein, the terms "comprises" and "includes," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

The invention claimed is:

1. A system for mitigating damage caused by the presence of a liquid solution in a battery system comprising:
    a first liquid solution sensor, the first liquid solution sensor comprising a plurality of dielectric measurement contact points;
    a liquid solution detection system communicatively coupled to the first liquid solution sensor configured to detect a presence of the liquid solution in the battery system based on information provided by the first liquid solution sensor, the liquid solution detection system comprising a hall-effect switch configured to be actuated to implement a first action based on a current measured by the first liquid solution sensor exceeding a first threshold; and
    system; and
    a first valve communicatively coupled to the liquid solution detection system configured to be actuated based on the hall-effect switch being actuated to implement the first action.

2. The system of claim 1, wherein the liquid solution comprises a liquid coolant solution.

3. The system of claim 2, wherein the liquid coolant solution comprises an ethylene glycol solution.

4. The system of claim 2, wherein the liquid coolant solution comprises a solution comprising glycol.

5. The system of claim 1, wherein the liquid solution comprises a solution comprising water.

6. The system of claim 1, wherein the first threshold is associated with a liquid solution comprising water being present in the battery system.

7. The system of claim 6, wherein the hall-effect switch is further configured to be actuated to implement a second action based on the current measured by the first liquid solution sensor exceeding a second threshold, the second threshold being associated with a liquid solution comprising liquid coolant being present in the battery system, the second action comprising providing a notification to a user of the presence of liquid coolant in the battery system and actuating the first value to allow the liquid solution to drain from the battery system.

8. The system of claim 1 further comprising:
    a second liquid solution sensor communicatively coupled to the liquid solution detection system,
    wherein the liquid solution detection system is further configured to detect an occurrence of a presence of liquid solution in the battery system based on information provided by the second liquid solution leak sensor.

9. The system of claim 8, wherein the first liquid solution sensor is disposed in a first compartment of the battery system and the second liquid solution sensor is disposed in a second compartment of the battery system.

10. The system of claim 9 further comprising:
    a second valve communicatively coupled to the liquid solution detection system,
    wherein the first valve is further configured to be actuated based on the liquid solution detection system detecting the presence of liquid solution in the first compartment and the second valve is configured to be actuated based on the liquid solution detection system detecting the presence of liquid solution in the second compartment.

11. The system of claim 1, wherein the battery system comprises a high-voltage battery system included in a vehicle.

12. The system of claim 1, wherein the first valve is configured to be actuated by a solenoid.

13. The system of claim 1, wherein the liquid solution detection system is further configured to provide an indication to a vehicle telematics system upon detecting the presence of liquid solution in the battery system.

14. The system of claim 13, wherein the vehicle telematics system is configured to provide a notification to a user of the presence of liquid solution in the battery system based on the indication.

15. The system of claim 13, wherein the vehicle telematics system is configured to provide a notification to a telematics system service center of the presence of liquid solution in the battery system based on the indication.

16. The system of claim 1, wherein the first valve is further configured to be opened based on the liquid solution detection system detecting the presence of liquid solution in the battery system.

17. The system of claim 16, wherein the first valve is further configured to allow liquid solution to drain from the battery system when opened.

18. A method for mitigating damage caused by the presence of a liquid solution in a battery system comprising:

receiving current measurement information from a liquid solution sensor comprising a plurality of dielectric measurement contact points disposed in the battery system;

identifying, using a hall-effect switch, based on the current measurement information exceeding a first threshold, the presence of a liquid solution comprising water in the battery system;

implementing a first action based on identifying the presence of the liquid solution comprising water in the battery system, the first action comprising actuating a valve configured to allow the liquid solution to drain from the battery system;

determining, using the hall-effect switch, based on the current measurement information exceeding a second threshold, the presence of a liquid solution comprising liquid coolant in the battery system; and implementing a second action based on identifying the presence of presence of the liquid solution comprising liquid coolant in the battery system, the second action comprising actuating the valve to allow the liquid solution to drain from the battery system and providing a notification to a user of the presence of liquid coolant in the battery system.

19. The method of claim 18, wherein actuating the valve comprises opening the valve.

* * * * *